United States Patent [19]
Le Guyadec et al.

[11] Patent Number: 5,898,723
[45] Date of Patent: Apr. 27, 1999

[54] METAL VAPOR LASER DEVICE

[75] Inventors: Eric Le Guyadec, St. Paul Trois Chateaux; Guy Bertrand, Suze la Rousse, both of France

[73] Assignees: Commissariat a l'Energie Atomique; Compagnie Generale des Matiers Nucleaires, both of France

[21] Appl. No.: 08/778,551

[22] Filed: Jan. 3, 1997

[30] Foreign Application Priority Data

Jan. 3, 1996 [FR] France .................................... 96 00025

[51] Int. Cl.$^6$ .............................. H01S 3/22; H01S 3/223
[52] U.S. Cl. ............................................................. 372/56
[58] Field of Search ........................................ 372/56, 61

[56] References Cited

U.S. PATENT DOCUMENTS 5,339,327  8/1994  Livingston et al. .

FOREIGN PATENT DOCUMENTS

| 0 402 842 | 12/1990 | European Pat. Off. . |
| 0402842 | 12/1990 | European Pat. Off. ........ H01S 3/227 |
| 1-230284 | 9/1989 | Japan ................................ H01S 3/22 |
| 2219128 | 11/1989 | United Kingdom .............. H01S 3/22 |

OTHER PUBLICATIONS

"A High–Efficiency 200 W Average Power Copper HyBrID Laser" Jones et al IEEE Journal of Quantum Electronics; 30(1994) Oct., No. 10; pp. 2385–2390.

Primary Examiner—Rodney Bovernick
Assistant Examiner—Robert E. Wise
Attorney, Agent, or Firm—Hayes, Soloway, Hennessey, Grossman & Hage, P.C.

[57] ABSTRACT

This invention relates to a metal vapor laser device comprising a sealed enclosure, electrodes placed inside this enclosure, a reactant metal or metal alloy placed between the electrodes, and an elongated pipe or tube to introduce reactive gas between the two electrodes.

19 Claims, 2 Drawing Sheets

METAL VAPOR LASER DEVICE

BACKGROUND OF THE INVENTION

1. Field of the Invention

The present invention relates to metal vapor laser devices composed of a set of tubes containing metal to create the laser effect. Electrodes are placed at the two ends of an internal tube, and a pulsed electrical discharge is set up between these electrodes by means of a suitable electricity power supply. This discharge heats this medium between the electrodes, and an injected reactive gas then forms a volatile compound with the metal to be vaporized. The resulting atomic metallic vapor is also excited by the discharge and is subjected to population inversion which is the cause of the laser effect.

2. Description of Related Art

A number of examples of metal vapor laser devices are known, for example metallic halide lasers.

One such laser device is described in document GB-2 219 128. This device comprises an enclosure containing two electrodes and cylindrical metal segments, for example, made of copper or gold. During operation, a halogen gas (for example, bromine mixed with a helium buffer gas) circulates through the enclosure, and a metallic halide (for example, CuBr or $Cu_3Br_3$) is produced. When the discharge takes place between electrodes, the metallic halide is vaporized and dissociates to form copper vapor which is then excited to produce a population inversion.

Another device is described in document U.S. Pat. No. 5,339,327. This device comprises a laser tube closed by two windows at its ends, and two electrodes placed inside it. One or several chambers or reaction vessels placed outside the tube contain metal, for example, copper in granular form. Neon and a halogen gas are allowed into this chamber. A coil surrounds the chamber and heats the metal contained in it. When the gas passes the coil, a metal halide is formed which vaporizes due to heating. The assembly is then inserted in the laser tube followed by dissociation of the metal halide and excitation of resulting products causing a population inversion.

A third device is described in the article by D. R. JONES et al. entitled "A high-efficiency 200 W average power copper HgBrID laser", which appeared in the IEEE Journal of Quantum Electronics, vol. 30, No. 10, p. 2385–2390, October 1994.

This device comprises a silica tube inside which there is an alumina tube. A copper anode and cathode, both cylindrical, on each side of this tube create a discharge. A mixture of Ne and HBr is added, the gas inlet being located on the same side as the anode opposite the side facing the alumina tube. Similarly, the gas outlet is on the same side as the cathode opposite the side facing the alumina tube.

In still other known devices, the gas is mixed before it reaches the laser, the active gas usually being introduced between the anode and the nearest window. Everything that remains of the gas after the discharge and the laser effect is extracted from the other side, between the cathode and the other window. Consequently, before entering the internal tube, the active gas passes through an electrode which necessarily includes high temperature zones in which it may react or decompose. The consequence of this is a high consumption of reactive gas (the third document mentioned above gives a consumption of the order of 3 to 4 normoliters/hour), and a reduction in the life of components, particularly of electrodes exposed to the reactive gas. The composition of this vapor phase is modified, and it may even be polluted by corrosion products.

Furthermore, the active gas reacts with metal, therefore its composition changes as it passes along the internal tube. Consequently, the metal halide concentration may have a high longitudinal gradient inside the tube.

SUMMARY OF THE INVENTION

Accordingly, the present invention provides a metal vapor laser device comprising:

a sealed enclosure, electrodes placed inside this enclosure, a reactant metal or metal alloy placed between the electrodes, an elongated pipe in which a reactive gas is introduced between the two electrodes, this elongated pipe being perforated with one or several holes, or being porous at one or several points.

These holes, or these points, are located at the location(s) at which the gas is to be injected. The reactant metal or metal alloy may then be placed in front of the hole(s), or in front of the porous point(s).

The reactant gas in the device according to the invention is directed beyond the anode or the cathode, depending on the selected direction of circulation. Therefore, before arriving in the internal tube, the active gas is no longer in contact with either of the electrodes; reactions, and particularly decomposition reactions, will no longer take place. The result is a lower consumption of reactive gas (observed active gas flows used were of the order of 1 normoliter/hour). Furthermore, the life of the other components less exposed to the reactive gas is increased. In practice, the composition of the vapor phase is modified, and it is less polluted by corrosion products.

An inert gas may be added into the enclosure, on the same side as at least one of the electrodes opposite the side of the electrode facing the metal or metal alloy.

Furthermore, the reactant metal or metal alloy may be placed in an internal tube, itself placed between the two electrodes.

Furthermore, the active gas can be extracted from the inside of the tube between the two electrodes. In this case, the contact with the second electrode is also avoided, reactions that can reduce the life of this second electrode are thus avoided. Gas extraction may include an elongated pipe in which there are perforated holes or porous points at the location(s) at which the gas is to be extracted.

According to a second embodiment, another objective of the invention is a metal vapor laser device comprising:

a sealed enclosure, electrodes placed inside this enclosure, a reactant metal or metal alloy placed between the electrodes, an internal tube inside which there is a reactant metal or metal alloy placed between the electrodes, the internal tube being perforated with holes. The reactive gas may be introduced in this tube and between the two electrodes at the same time, through the holes in the internal tube.

Thus, an internal tube may itself be perforated with holes through which the reactive gas may be introduced. In this case, the presence of an elongated pipe to introduce or extract the active gas is no longer necessary, which simplifies construction of the device, particularly for the electrodes.

Furthermore, this device has the same advantages as the device in the first embodiment (no gas-electrode contact, therefore decomposition reactions are avoided; lower consumption of reactive gases; longer components life; less pollution of the vapor phase).

In all cases, the electrodes may be protected by adjusted sleeves made of an inert material.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
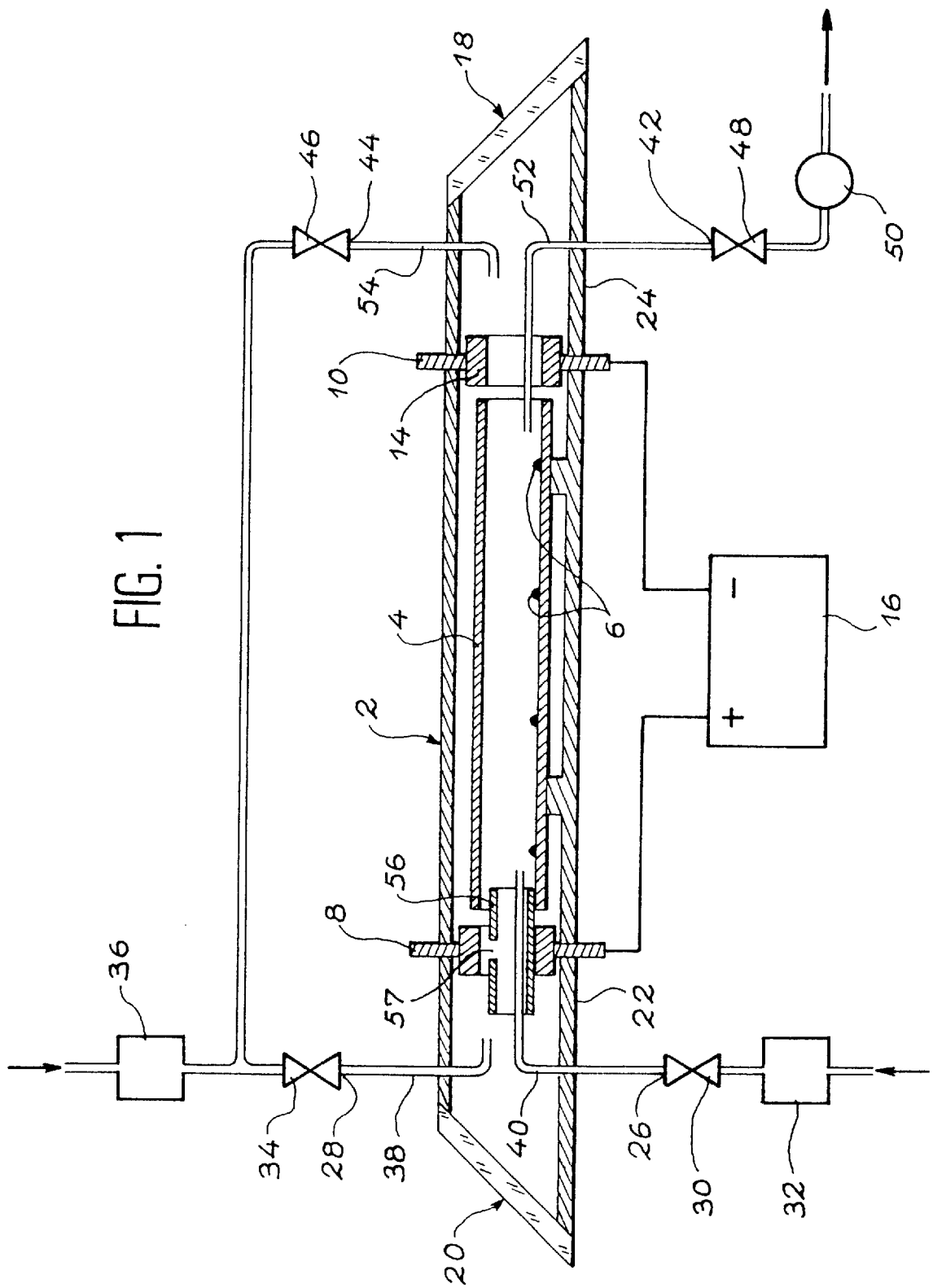
FIG. 1 is an example embodiment of a device according to the invention.

In the example embodiment given in FIG. 1, the laser device is composed of an external tube 2 made of silica and an internal tube 4 made of silica or alumina, containing a reactant metal or metal alloy 6. Electrode holder flanges 8, 10 support electrodes 12, 14 used to create an electrical discharge when they are connected to a pulsed electricity power supply 16. Transparent windows 18, 20 made of silica or sapphire are placed at the two ends so that the optical energy can be extracted. They are supported by flanges 22, 24 which are fitted on flanges 8, 10.

Flange 22 contains two gas inlet connectors 26, 28. The reactive gas (which is a mixture of a halogen compound, for example, HBr and a rare gas such as neon) circuit is connected to inlet 26. This circuit is composed of a pressure reduction valve 30 and a flow regulator 32.

A circuit for scavenging electrode 12 with an inert gas such as neon or argon is connected to the other inlet 28. This circuit consists of a pressure reduction valve 34 and a flow regulator 36.

The gas pipe 38 connected to connector 28 leads into the laser between the window 20 and electrode 12.

A reactive gas pipe 40 connected to connector 26 leads into the internal tube 4 between the electrode 12 and the electrode 14.

The flange 24 also has two connectors 42, 44. The inert scavenging gas arrives through connector 44, after passing through the flow regulator 36 and a pressure reduction valve 46.

The gases introduced through a pressure adjustment valve 48 and a pump fitted with filters 50 are extracted through connector 42.

The gas extraction pipe 52 connected to connector 42 leads into the internal tube 4 between electrode 14 and electrode 12. The gas pipe 54 connected to connector 44 has its orifice located between electrode 14 and window 18.

The dimensions and operating conditions for this device are as follows:

internal laser tube 4 length: about 2 m, internal laser tube 4 diameter: about 5 cm, internal laser tube temperature: about 600° C., total gas pressure: about 30 mbars, metal partial pressure: about 0.1 mbars, voltage pulse: about 20 kV, voltage pulse duration: about 100 ns, pulse repetition frequency: about 20 kHz.

The reactive gas used is electronegative so that operation is possible at a high repetition frequency (e.g. 20 kHz), and that a reaction can take place with metal or an alloy (copper, gold, cesium or silver, etc.) at a relatively low temperature (e.g. 600° C.) to form a metal compound which will then be dissociated either thermally or by the discharge at the center of the tube. This is why this reactive gas is a halide, preferably of the HBr or HCl type. It is directed beyond electrodes 12, 14, in the form of a mixture with a rare gas (Ne, He, Ar, etc.) through pipes such as pipe 40, so that it will only react with the metal or alloy (copper, gold, cesium, silver, etc.) present in internal tube 4.

The zones through which pipe 40 passes close to electrode 12 may be increased to high temperature (typically 500–1000° C.). Furthermore, it is preferable not to disturb the electrical operation of the laser. Accordingly, the materials used for pipe 40 can preferably be electrical insulators and capable of resisting high operating temperatures. Furthermore, they pass very close to the internal walls so that they do not block the laser beam. Materials such as molten silica or alumina are very suitable. Steps are also taken to ensure that the discharge "pick up" point on the electrode is sufficiently far from the pipe.

A sleeve 56 made of an inert material (for example, silica, alumina, etc.) may be provided on either of the electrodes, or on both, to protect them from the discharge energy. An opening 57 in this sleeve localizes the discharge pick up point on electrode 12 and keeps the pipe 40 sufficiently far away from the pick up point.

According to another embodiment, the polarities of the two electrodes may be reversed, and in this case the reactive gas will be injected beyond the cathode.

In the example shown in FIG. 1, the pipe 40 stops at the inlet to the internal tube 4. It may also be extended further inside this tube, for example just above a metal deposit or a metal alloy deposit 6.

Figure 2:
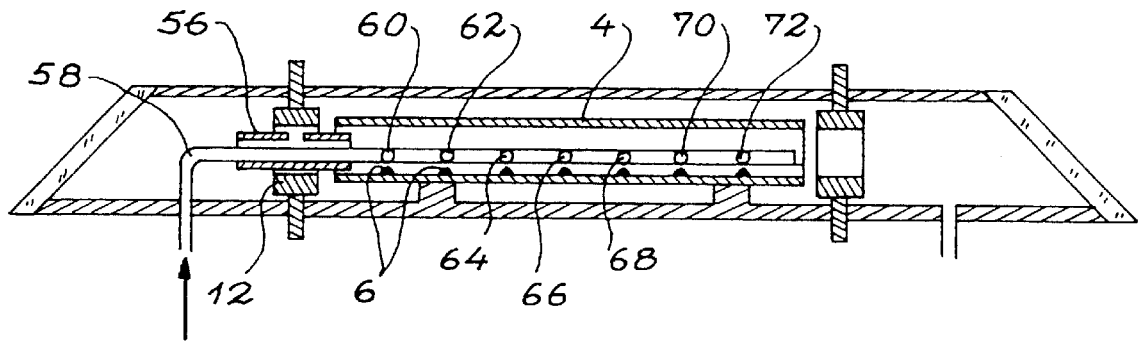
FIG. 2 is another example embodiment of a device according to the invention.

Another embodiment according to the invention is shown in FIG. 2. In this Figure, numeric references with the same numbers as those in FIG. 1 refer to identical or equivalent elements. Pipe 58 used to introduce reactive gasses extends along the entire length of internal tube 4. It has several holes 60, ..., 72, through which the reactive gas is introduced inside cavity 4. Preferably, metal or metal alloy deposits 6 are located facing these holes; the reaction takes place with the gas immediately that it exits from pipe 58, which has the advantage that the use of the gas is optimized. Holes 60, ..., 72 may be replaced by porous zones located along the pipe 58, through which the reactive gas diffuses towards the inside of tube 4. Due to the layout of holes or porous zones along tube 58, the reactive gas is distributed uniformly inside the tube and the reaction with the metal compound 6 is more efficient.

Figure 3:
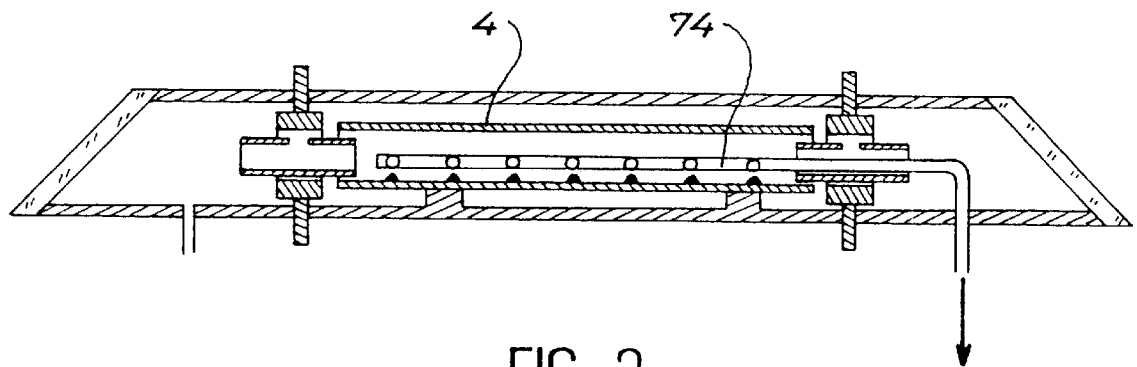
FIG. 3 represents a device with extraction of active gas between the electrodes.

Another embodiment will be described with reference to FIG. 3, in which the reactive gas inlet pipe is not shown. The pipe 74 is a gas extraction pipe to extract gas from inside tube 4. This pipe may be perforated with one or several holes, as shown in the case of the gas inlet pipe in FIG. 2. Similarly, these holes may be replaced by one or several porous zones through which the active gas diffuses from inside cavity 4 to the inside of pipe 74. Extraction thus takes place from the inside of tube 4, preventing all contacts between the active gas and the electrode on the side on which these gases are extracted. When the pipe 74 contains several holes or porous zones along the entire length of tube 4, a uniform extraction takes place over the entire length of the tube.

Figure 4:
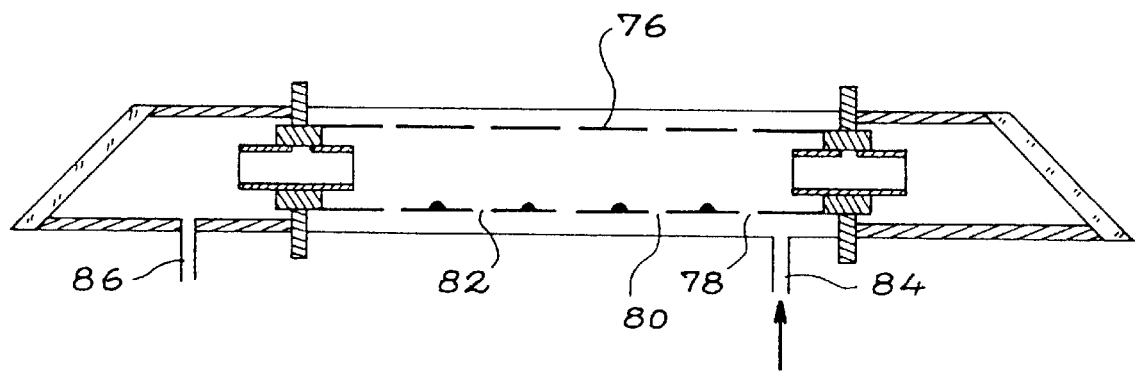
FIG. 4 is an alternative device according to the invention.

Another embodiment will now be described with reference to FIG. 4. In this figure, the internal tube 76 is perforated by a number of holes 78, 80, 82, etc. which are used to introduce reactive gas into the internal tube through inlet pipe 84, and to extract gases through the outlet pipe 86. The outlet pipe 86 may also be located before the outlet electrode, in other words between the two electrodes, in which case the active gas is not in contact with this electrode during its extraction. Metal deposits or metal alloy deposits are located between holes 78, 80, 82, etc. The reaction takes place with the gas as soon as it passes through the holes. Here again, the use of gas is optimized, the reactive gas is distributed uniformly inside the tube and the reaction with the metal compound is more efficient.

We claim:

1. A metallic vapor laser device comprising:

a sealed enclosure, electrodes placed inside the enclosure, a reactant metal or metal alloy placed between the electrodes, each electrode having one side facing the metal or metal alloy, and an elongated pipe running at least in part between the two electrodes, through which a reactive gas may be introduced between the two electrodes, said elongated pipe having at least one hole, with the reactant metal or metal alloy being located in front of the at least one hole.

2. A device according to claim 1, further comprising an inlet though which an inert gas may be introduced into the enclosure on the same side as at least one of the electrodes, opposite the side of the electrode facing the metal or metal alloy.

3. A device according to claim 2, further comprising an internal tube inside which the reactant metal or metal alloy is located, said internal tube being located at least in part between the two electrodes, said elongated tube extending at least in part inside said internal tube.

4. A device according to claim 3, further comprising an outlet through which gas may be extracted from inside the tube between the two electrodes.

5. A device according to claim 4, wherein said outlet includes an elongated extraction pipe fitted with holes at locations at which the gas is extracted, said elongated extraction pipe extending at least in part inside said internal tube.

6. A device according to claim 2, wherein the reactant metal or metal alloy is located in front of said at least one hole.

7. A device according to claim 1, further comprising an internal tube inside which the reactant metal or metal alloy is located, said internal tube being located between said two electrodes, said elongated pipe extending at least in part inside said internal tube.

8. A device according to claim 7, further comprising an outlet through which gas may be extracted from inside the tube between the two electrodes.

9. A device according to claim 8, wherein said outlet includes an elongated extraction pipe fitted with holes at locations at which the gas is extracted, said elongated extraction pipe extending at least in part inside said internal tube.

10. Device according to claim 1, the reactant metal or metal alloy being located in front of the hole(s) or in front of the porous point(s).

11. A device according to claim 1, wherein the electrodes are protected by adjusted sleeves made of inert materials.

12. A metal vapor laser device comprising:

a sealed enclosure, electrodes located inside the enclosure, a reactant metal or metal alloy located between the electrodes, an elongated perforated tube inside which the reactant metal or metal alloy is located, running at least in part between the two electrodes for introducing a reactive gas inside said internal tube and between said two electrodes.

13. A device according to claim 12, wherein the electrodes are protected by adjusted sleeves made of inert materials.

14. Metallic vapor laser device comprising:

a sealed enclosure, electrodes placed inside the enclosure, a reactant metal or metal alloy placed between the electrodes, each electrode having one side facing the metal or metal alloy, an elongated pipe, running at least in part between the electrodes, through which a reactive gas may be introduced between the two electrodes, the elongated pipe being porous along at least part of its length, the reactant metal or metal alloy being located in front of the porous part.

15. A device according to claim 14, further comprising an inlet through which an inert gas may be introduced into the enclosure on the same side as at least one of the electrodes, opposite the side of the electrode facing the metal or metal alloy.

16. A device according to claim 14, further comprising an internal tube inside which the reactant metal or metal alloy is located, said internal tube being located between said two electrodes, said elongated pipe extending at least in part inside said internal tube.

17. A device according to claim 16, further comprising an outlet through which gas may be extracted from inside the tube between the two electrodes.

18. A device according to claim 14, wherein said outlet includes an elongated extraction pipe which is porous along at least part of its length at locations at which the gas is to be extracted, said elongated extraction pipe extending at least in part inside said internal tube.

19. A device according to claim 14, wherein the electrodes are protected by adjustable sleeves made of inert materials.

* * * * *